United States Patent [19]

Igoe

[11] 4,058,636

[45] Nov. 15, 1977

[54] INSTANT ACIDIFIED MILK GEL

[75] Inventor: Robert S. Igoe, San Diego, Calif.

[73] Assignee: Merck & Co., Inc., Rahway, N.J.

[21] Appl. No.: 735,557

[22] Filed: Oct. 26, 1976

Related U.S. Application Data

[63] Continuation-in-part of Ser. No. 620,899, Oct. 8, 1975, abandoned.

[51] Int. Cl.² .......................... A23L 1/04; A23L 1/09
[52] U.S. Cl. .................................. 426/573; 426/578; 426/580; 426/658
[58] Field of Search ............... 426/573, 334, 578, 580, 426/583, 650, 654, 658

[56] References Cited

U.S. PATENT DOCUMENTS

| | | | |
|---|---|---|---|
| 3,507,664 | 4/1970 | Schuppner | 426/573 |
| 3,539,363 | 11/1970 | Morgan et al. | 426/334 |
| 3,726,690 | 4/1973 | Schuppner | 426/583 |
| 3,917,875 | 11/1975 | Gardiner | 426/578 |
| 3,955,009 | 5/1976 | Eskritt et al. | 426/578 |

*Primary Examiner*—Raymond N. Jones
*Assistant Examiner*—C. A. Fan
*Attorney, Agent, or Firm*—Donald J. Perrella

[57] ABSTRACT

A composition and method are provided for preparing an instant acidified milk gel product, characterized by smooth body with no graininess and good flavor. The dry composition comprises color, flavor, food acidulent, carbohydrate sweetener, and a thickener system which is a blend of carboxymethyl cellulose, xanthan gum and locust bean gum, and optionally starch.

7 Claims, No Drawings

INSTANT ACIDIFIED MILK GEL

RELATED APPLICATION

This application is a continuation-in-part of U.S. Ser. No. 620,899, filed Oct. 8, 1975, now abandoned.

BACKGROUND OF THE INVENTION

This invention relates to an instant acidified mild gel product.

It has long been desired to successfully prepare an instant milk gel containing an acidulent. Such a product would have novel and interesting textural properties as well as desirable organoleptic properties. There are inherent difficulties, however, in preparing such a product as milk has a tendency to curdle in the presence of acidulents. While acidifed milk gels are disclosed in my copending U.S. Pat. application Ser. No. 577,145, filed May 13, 1975, such gels are not instant gels and they contain about equal amounts of milk and fruit juice.

OBJECTS OF THE INVENTION

Accordingly, it is an object of the present invention to provide an acidulent-containing composition which can be combined with milk to provide an instant milk gel. Another object is to provide an acidulent-containing composition which can be combined with milk to provide an instant milk gel without necessity for chemical neutralizers. A further object is to provide a milk gel which will be highly palatable, have a nutritional protein content, a smooth and creamy consistency, a tenderbody, a firm texture, and a relatively long life without deterioration. It is a further object of this invention to provide a particularly pleasing and nutritious dessert per se. Still another object is to provide a thickener composition for the acidulent-containing composition which is combined with milk to provide the instant milk gel of the present invention. Yet another object is to provide an acidified milk dessert which exhibits no protein precipitation. These and other objects of the present invention will become apparent from the following description.

SUMMARY OF THE INVENTION

A composition for preparing an instant acidified milk gel product, characterized by smooth body with no graininess and good flavor comprises a food acidulent, a sweetening agent, and a thickener system which is a blend of carboxymethyl cellulose, xanthan gum and locust bean gum, and optionally starch. The thickener is used at a level of from about 2.5% to about 10% by weight based on the weight of the total solids before adding milk. The food acidulent is present in sufficient quantity to adjust the pH of the entire system when combined with milk to from about 3.8 to about 4.3. Small amounts of coloring and flavoring materials optionally may be present.

The starch-free thickener composition comprises from about 20-35% xanthan gum, from about 20-35% locust bean gum, and from about 30-60% carboxymethyl cellulose. The starch-containing thickener system comprises from about 13-24% xanthan gum, from about 13-24% locust bean gum, from about 14-23% carboxymethyl cellulose, and from about 31-53% pregelatinized starch.

DETAILED DESCRIPTION

The present invention is directed to an instant-type acid milk gel using a blend of dry ingredients which is added to cold milk with mixing followed by refregeration. By an instant type gel is meant one which does not require heating. The blend of dry ingredients comprises a thickener system, acidulent, sweetening agent, and optional coloring and flavoring. The thickener system is a blend of carboxymethyl cellulose having a degree of substitution range of from 0.65 to 0.95 (CMC), xanthan gum and locust bean gum and optionally pregelatinized starch. In general, based on the total weight of the thickener composition, the carboxymethyl cellulose is present in an amount of from about 14% to about 60%, the xanthan gum is present in an amount of from about 13% to about 35%, the locust bean gum is present in an amount of from about 13% to about 35%, and starch is optionally but preferably present in an amount of from about 0% to about 53%. Examples of typical thickener compositions follow:

| Ex. | CMC | Starch | Xantham Gum | Locust Bean Gum |
|---|---|---|---|---|
| A | 33 | 0 | 34 | 33 |
| B | 60 | 0 | 20 | 20 |
| C | 48 | 0 | 26 | 26 |
| D | 30 | 0 | 35 | 35 |
| E | 47 | 0 | 20 | 33 |
| F | 43 | 0 | 35 | 22 |
| G | 21 | 53 | 13 | 13 |
| H | 19 | 51 | 15 | 15 |
| I | 14 | 38 | 24 | 24 |
| J | 22 | 34 | 22 | 22 |
| K | 17 | 47 | 18 | 18 |
| L | 19 | 41 | 20 | 20 |
| M | 23 | 31 | 23 | 23 |

It will be seen from the foregoing table that starch may be omitted from the thickener formulation. When starch is not present the thickener composition comprises from about 20% to about 35% xanthan gum, from about 20% to about 35% locust bean gum, and from about 30% to about 60% carboxymethyl cellulose. When starch is present the thickener composition comprises from about 13% to about 24% xanthan gum, from about 13% to about 24% locust bean gum, from about 14% to about 23% carboxymethyl cellulose, and from about 31% to about 53% pregelatinized starch.

The blend of dry ingredients contains from about 2.5% to about 10% by weight of thickener composition, and food acidulent in an amount sufficient to adjust the pH of the system when the dry blend is combined with milk to between from about 3.8 and about 4.3. If the pH is beyond that required to produce the foregoing range, the product will be coarse in texture, indicative of protein reaction. Flavoring and coloring ingredients are optionally present in small amounts, and the balance is a sweetening agent.

The food acidulent may be a food grade acid such as, e.g., fumaric, adipic, citric, tartaric, malic or succinic, either in anhydrous or hydrated state, or a mixture of two or more of the foregoing. The food acidulent is present in quantity sufficient to adjust the pH of the final composition when blended with milk in quantity sufficient to form a gel to from about 3.8 to about 4.3. The sweetening agent may be a carbohydrate sweetener or an artificial sweetener. The carbohydrate sweetener may be a monosaccharide sugar such as, e.g., fructose or dextrose (glucose) or a disaccharide sugar such as, e.g., sucrose or lactose, or a mixture of two or more sugars. The carbohydrate sweetener is present in amount of from about 80% to about 93%. The artificial sweetener may be saccharin, an alkali metal salt or alkaline earth salt of saccharin or a peptide such as L-aspartyl-L-phenylalanine methyl ester.

To prepare the instant acidified milk gel product of the present invention, about 100 g. of the foregoing blend of thickener, acidulent and sweetening agent are mixed with about 2 cups (0.47 liter) of cold milk in a mixing bowl while stirring. After stirring for several minutes the mixture is poured into gel dishes and refrigerated until the gel is set. The texture and flavor release of the resulting gels can be modified by adjusting the levels of xanthan gum, locust bean gum and starch. An increase in starch level beyond about 5% by weight of total solids, however, tends to mask the flavor release and produces a pastier body, while an increase in either xanthan gum or locust bean gum beyond about 50% results in a gummier body of poor flow.

It is noted that the use of carboxymethyl cellulose as a protein stabilizer has been taught in the literature, see C.A., 56, 1816b; C.A., 78, 83016u. Also taught in the literature is the use of xanthan gum and locust bean gum to thicken acidified milk products, see U.S. Pat. No. 3,726,690. In these cases the milk products have a high fat content, unlike the products of the present invention wherein the only fat is that present in the milk.

The following examples illustrate the present invention without, however, limiting the same thereto.

EXAMPLE 1

| INSTANT STRAWBERRY MILK GEL | |
|---|---|
| Ingredients | % by Weight |
| Xantham gum | 1.90 |
| CMC | 1.90 |
| Locust bean gum | 1.90 |
| Fumaric acid | 2.80 |
| Instant strawberry flavor | 0.08 |
| F D & C Red No. 2 | 0.015 |
| Sucrose | 91.405 |
| | 100.00 |

100 Grams of the foregoing ingredients are blended and added to two cups (0.47 liter) of cold milk in a mixing bowl while stirring at slowest speed with an electric mixer for seven minutes. The mixture is then poured into a gel dish and referigerated for 15-30 minutes until set.

EXAMPLE 2

| INSTANT STRAWBERRY MILK GEL | |
|---|---|
| Ingredients | % by Weight |
| Xanthan gum | 1.90 |
| CMC | 1.90 |
| Locust bean gum | 1.90 |
| Pregelatinized starch | 2.90 |
| Fumaric acid | 2.80 |
| Instant strawberry flavor | 0.08 |
| FD & C Red No. 2 | 0.015 |
| Sucrose | 88.505 |
| | 100.00 |

The foregoing ingredients are treated according to the procedure of Example 1 to form a gel.

EXAMPLE 3

| INSTANT LEMON MILK GEL | |
|---|---|
| Ingredients | % by Weight |
| Xanthan gum | 1.90 |
| CMC | 1.90 |
| Locust bean gum | 1.90 |
| Pregelatinized starch | 2.90 |
| Fumaric acid | 2.00 |
| Lemon juice powder (Borden's) | 8.00 |
| FD & C Yellow No. 5 | 0.02 |
| Sucrose | 81.38 |
| | 100.00 |

The foregoing ingredients are treated according to the procedure of Example 1 to form a gel.

EXAMPLES 4-9

The following examples are prepared according to the procedure of Example 1.

| Ingredients | 4 | 5 | 6 | 7 | 8 | 9 |
|---|---|---|---|---|---|---|
| Xanthan gum | .5 | 1.0 | 1.2 | 1.9 | .19 | 2.5 |
| CMC | 1.5 | 1.5 | 1.5 | 1.9 | 1.9 | 1.5 |
| Locust Bean Gum | .5 | 1.0 | 1.2 | 1.9 | 1.9 | 2.5 |
| Pregelatinized Starch | — | 4 | 4 | 2.9 | 4 | 4 |
| Fumaric Acid, Powder | 2.7 | 2.7 | 2.7 | 2.7 | 2.7 | 2.7 |
| Strawberry Flavor | .2 | .2 | .2 | .2 | .2 | .2 |
| F D & C Red No. 2 | .02 | .02 | .02 | .02 | .02 | .02 |
| Sugar | Add to 100% | Add to 100% | Add to 100% | Add to 100% | Add to 100% | Add to 100% |
| | Soft, tender body | Slightly firm body | Firm body | Firmer body | Similar to Ex. 7 | Very firm, heavy mix as compared to Ex. 6 |

What is claimed is:

1. A dry composition which contains a thickener composition, a carbohydrate sweetener and a food acidulent for preparing an instant acidified milk gel product, the dry composition consisting essentially of from about 2.5 weight % to about 10 weight % thickener composition, from about 80 weight % to about 93 weight % carbohydrate sweetener, and an amount of food acidulent effective to adjust the pH of the composition to from about 3.8 to about 4.3 when blended with an amount of milk effective to form a gel, the thickener comprising carboxymethyl cellulose, xanthan gum and locust bean gum, the thickener ingredients being present in the following percentages by weight of the thickener: xanthan gum, from about 20% to about 35%; locust bean gum, from about 20% to about 35%; and carboxymethyl cellulose, from about 30% to about 60%.

2. A dry composition which contains a thickener composition, a carbohydrate sweetener and a food acidulent for preparing an instant acidified milk gel product, the dry composition consisting essentially of from about 2.5 weight % to about 10 weight % thickener composition, from about 80 weight % to about 93 weight % carbohydrate sweetener, and an amount of food acidulent effective to adjust the pH of the composition to from about 3.8 to about 4.3 when blended with an amount of milk effective to form a gel, the thickener comprising carboxymethyl cellulose, xnathan gum, locust bean gum, and pregelatinized starch, the thickener ingredients being present in the following percentages by weight of the thickener: xanthan gum, from about 13% to about 24%; locust bean gum, from about 13% to about 24%; carboxymethyl cellulose, from about 14% to about 23%, and starch from about 31% to about 53%.

3. A composition according to claim 1 wherein the food acidulent is fumaric acid, adipic acid, succinic acid, tartaric acid, citric acid, or malic acid, or a mixture of two or more thereof, and the carbohydrate sweetener is a monosaccharide or disaccharide sugar or a mixture thereof.

4. A composition according to claim 2 wherein the starch is present in an amount of from about 2.5% to about 4.5% by weight based on the total composition.

5. A composition according to claim 3 wherein the acidulent is fumaric acid.

6. A composition according to claim 2 wherein the thickener composition comprises about 15% by weight of xanthan gum, about 19% by weight of carboxymethyl cellulose and about 15% by weight of locust bean gum and about 51% by weight of starch.

7. A composition according to claim 2 wherein the food acidulent is fumaric acid, adipic acid, succinic acid, tartaric acid, citric acid, or malic acid, or a mixture of two or more thereof, and the carbohydrate sweetener is a monosaccharide or disaccharide sugar or a mixture thereof.

* * * * *